Sept. 16, 1930.  S. C. KIMBALL  1,776,234
OIL RECTIFIER
Filed Aug. 3, 1927
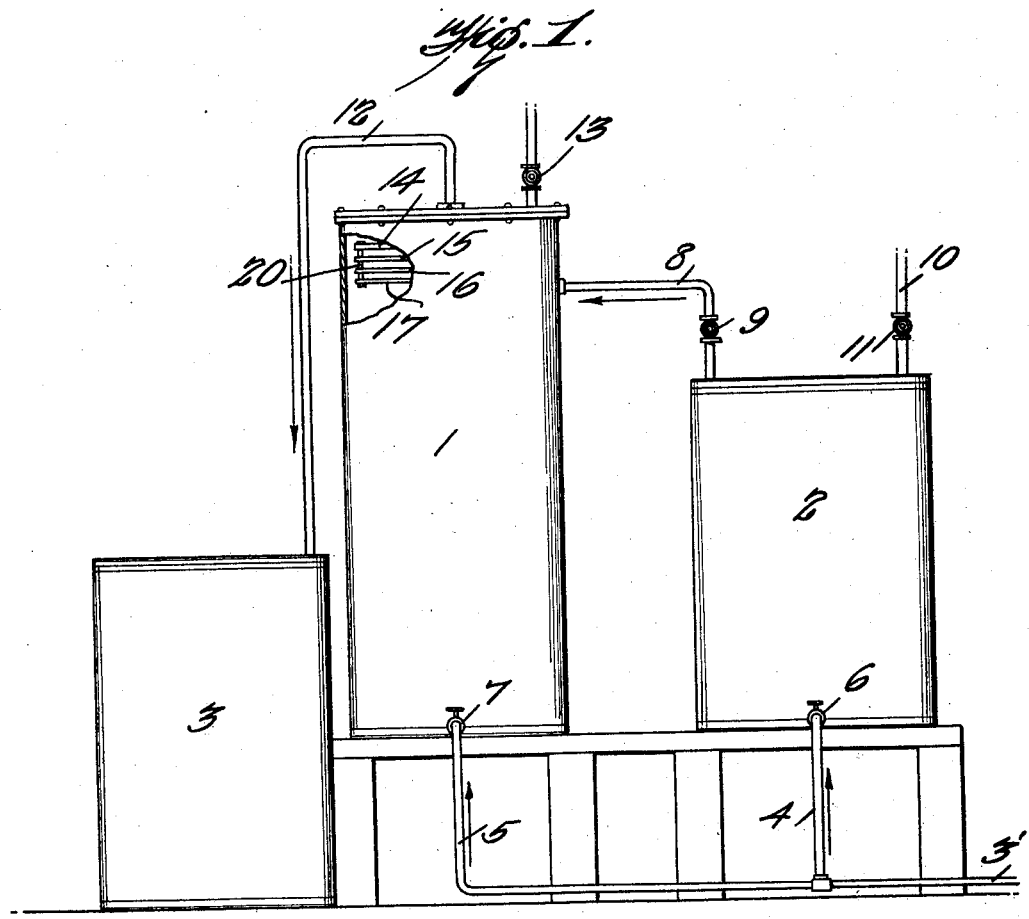
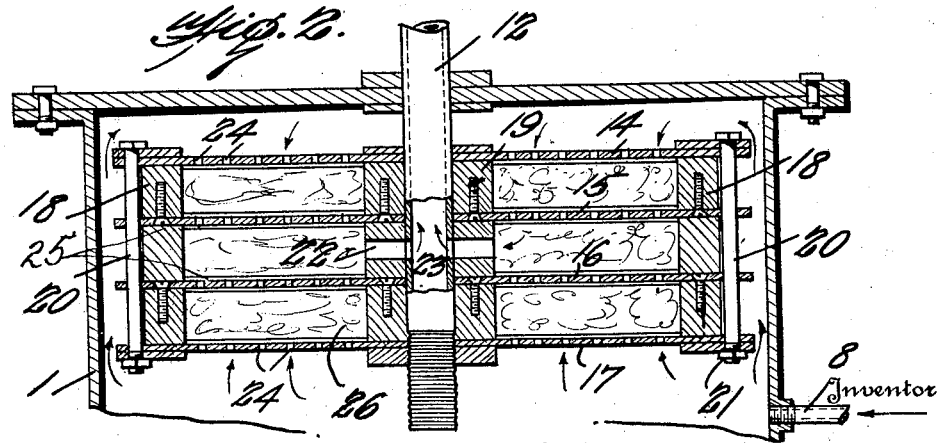
S. C. KIMBALL,
By F. P. Lorin
Attorney Patented Sept. 16, 1930

1,776,234

UNITED STATES PATENT OFFICE

SIMEON C. KIMBALL, OF TACOMA, WASHINGTON, ASSIGNOR TO THE HYDRO THERMAL OIL RENOVATOR CO., A CORPORATION OF WASHINGTON

OIL RECTIFIER

Application filed August 3, 1927. Serial No. 210,439.

This invention relates to improvements in means for separating impurities from liquids such, for example, as engine oil which has become impure by reason of sediment and foreign matter having become mixed with the oil during its use as a lubricant. By the use of my improved process for accomplishing this, and the novel device for carrying out the process, oil which has become practically useless from collection of sediment therein is brought back to its original value so that it can be used over and over again.

My improved process may be carried out either by the use of gravity acting upon the devices employed or by the assistance of any other power such, for example, as ordinary city water pressure, a pump and many other like means of forcing water or other liquid against the oil to be cleansed. In the employment of gravity alone for this power I rely upon the commonly called hydrostatic paradox, viz., the pressure exerted upon a body of fluid is in exact proportion to the height of the column and the area of the base regardless of the diameter of the column. In relying upon gravity alone the most simple and direct way of carrying out the process is to have the pipe or column of water enter the top of the container wherein the oil is located, although of course the pipe could be goosenecked and enter that container from the bottom. In depending upon city water pressure, for instance, I have a small column or pipe enter the oil container through its bottom, the same principle exactly being relied upon in either or all cases of applying the power. In other words, in relying upon city water pressure, pump or the like, the bottom of the oil container is the equivalent of what the top of it would be if gravity were depended upon. With this great pressure against the body of oil it can be forced through a porous body of very small voids so as to thoroughly cleanse the oil of even the minutest particles of impurities.

I accomplish these and other objects of my invention by the peculiar arrangement and combination of the parts as will be more fully hereinafter described and explained in the following specification, shown in the accompanying drawings, and finally pointed out in the appended claims.

In the drawings:

Figure 1 is a view in elevation of the apparatus.

Figure 2 is an enlarged sectional view of the upper portion of the purifying tank.

In the apparatus as shown in the drawings, 1 represents the purifying tank, 2 the supply tank and 3 the receiving tank for the purified oil. Both the supply tank and purifying tank are open to a source of fluid under pressure, here shown as a pipe 3' leading, for example, from the city service supply and having branches 4 and 5 controlled by valves 6 and 7 opening into the lower end of the supply tank and purifying tank.

The upper end of the supply tank communicates with the purifying tank by a pipe 8 having a valve control 9, the pipe 8 opening from the top of the supply tank and leading into the purifying tank at a point below the purifying apparatus therein. The supply tank is formed with a filling opening 10 having a valve 11 and the purifying tank has an outlet 12 in the shape of a pipe connection leading from the purifying tank to the receiving tank 3, the purifying tank being also provided with an air relief 13.

The pipe 12 extends into and depends within the purifying tank and is provided with a purifying element in the shape of a series of perforated metal disks 14, 15, 16 and 17. These disks which have a diameter less than that of the interior of the purifying tank, are supported on the depending portion of the pipe 12, which pipe is closed at its lower end below the purifier.

The disks are held in spaced relation by edge spacing elements 18 and center spacing elements 19, the latter fitting closely about the pipe. The purifying element is formed as a unit by bolts 20 which pass through the edges of the disks beyond the edge spacing elements, the bolts being headed at one end and provided with nuts 21 at the opposite end.

The center spacing elements arranged between the intermediate disks 15 and 16 are formed with lateral openings 22 leading to and communicating with openings 23 in the wall of pipe 12. The openings 24 in the disks other than the upper surface of disk 14 and the lower surface of disk 17 are covered by layers of asbestos 25 or similar filtering material, the spaces between the disks intermediate the edge and center spacing elements being filled with loose asbestos 26 or like filtering substance.

In operation, the oil to be cleansed is admitted through the inlet 10, following which the valve 11 is closed. During this admission, the air vent 13 from the purifying tank is opened to permit the escape of air. Valve 6 is opened to admit water under pressure to the interior of the supply tank, forcing the oil therefrom through the pipe 8 into the receiving tank below the purifier. The oil admitted to the purifying tank is subjected to pressure through the branch 5 of the water supply pipe, the valve 7 having been opened, and is forced upwardly through the pressure to which it is subjected and caused to be partly forced through the filtering disks and filtering media on the disks 16 and 17 and also forced around the edge of the purifier between it and the wall of the purifying tank and downwardly through the disks 14 and 15 and their filtering media. This operation tends to remove all impurities held in suspension and the purified oil is forced out through the passages 22 and 23, through the pipe 12 and into the receiving tank 3 in a cleansed condition.

What I claim to be new is:

1. An apparatus for cleansing suspended impurities in a body of oil including a tank, means for delivering oil thereto, means for maintaining the oil under pressure in the tank, a pipe for delivering oil from the tank, a purifying unit surrounding the pipe and suspended wholly by said pipe in completely spaced relation from the tank, said unit comprising a plurality of upper filtering members, a plurality of lower filtering members, and means connecting all said members to unite the members in a unit form, said pipe being formed with an inlet communicating with the space between the upper filtering members and the lower filtering members whereby the oil in order to reach the outlet in the pipe may pass upwardly through the lower filtering members in succession or downwardly through the upper filtering members in succession.

2. An apparatus for cleaning suspended impurities in a body of oil including a tank, means for delivering the oil thereto, a restricted outlet from the tank and a purifier through which the oil under pressure is forced from below and above said purifier to the outlet, said outlet being in the form of a pipe having an inlet opening, said purifier comprising a plurality of disks mounted on said pipe and arranged above the inlet opening to the pipe, a plurality of disks arranged on said pipe below the said inlet opening, filtering means between the disks, means for securing all of said disks together as a unit, and means for closing the space between the marginal edges of all disks, said latter means serving to space the disks relative to each other and to the inlet opening of the pipe.

In testimony whereof I affix my signature.

SIMEON C. KIMBALL.